(12) United States Patent
Shope et al.

(10) Patent No.: US 8,462,829 B2
(45) Date of Patent: Jun. 11, 2013

(54) SYSTEM AND METHOD FOR COMMUNICATING IN A LOSSY ENVIRONMENT

(75) Inventors: Steven M. Shope, Mesa, AZ (US); Vigneswaran Rajagopalan, Sunnyvale, CA (US)

(73) Assignee: Sandia Research Corporation, Mesa, AZ (US)

( * ) Notice: Subject to any disclaimer, the term of this patent is extended or adjusted under 35 U.S.C. 154(b) by 49 days.

(21) Appl. No.: 13/288,774

(22) Filed: Nov. 3, 2011

(65) Prior Publication Data

US 2013/0114643 A1   May 9, 2013

(51) Int. Cl.
   *H04B 1/00*   (2006.01)
(52) U.S. Cl.
   USPC ........... 375/142; 375/143; 375/146; 375/147; 375/150; 375/152; 375/219; 375/295; 375/316
(58) Field of Classification Search
   USPC ................ 375/142, 143, 146, 147, 150, 152, 375/219, 295, 316
   See application file for complete search history.

(56) References Cited

U.S. PATENT DOCUMENTS

| | | | |
|---|---|---|---|
| 4,951,263 A | 8/1990 | Shope | |
| 7,642,952 B2 | 1/2010 | Fukuda | |
| 7,724,182 B2 | 5/2010 | Inoue et al. | |
| 7,812,761 B2 | 10/2010 | Shirakawa | |
| 7,855,677 B2 | 12/2010 | Negoro et al. | |
| 2002/0159422 A1* | 10/2002 | Li et al. | 370/342 |
| 2006/0067278 A1* | 3/2006 | Li et al. | 370/335 |
| 2006/0268961 A1* | 11/2006 | Prestwich et al. | 375/146 |

* cited by examiner

*Primary Examiner* — Ted Wang
(74) *Attorney, Agent, or Firm* — Schmeiser, Olsen & Watts LLP; Charlene R. Jacobsen

(57) ABSTRACT

A method of wireless communication in a lossy environment entails generating a direct sequence spread spectrum (DSSS) code string that includes a pseudo-noise (PN) sequence followed by instances of shifted PN sequences, where the shifted PN sequences are produced in response to the content of the message. The PN sequence includes a plurality of chips arranged in a first order, and each of the shifted PN sequences includes the plurality of chips arranged in another order. A beacon signal modulated by the DSSS code string is transmitted from a transceiver and received at a receiver within the communication system. Correlation peaks are formed at the receiver, where each correlation peak is associated with one of the PN sequences or one of the shifted PN sequences. Shift values are determined from the correlation peaks and the shift values are decoded to produce the message at the receiver.

20 Claims, 12 Drawing Sheets

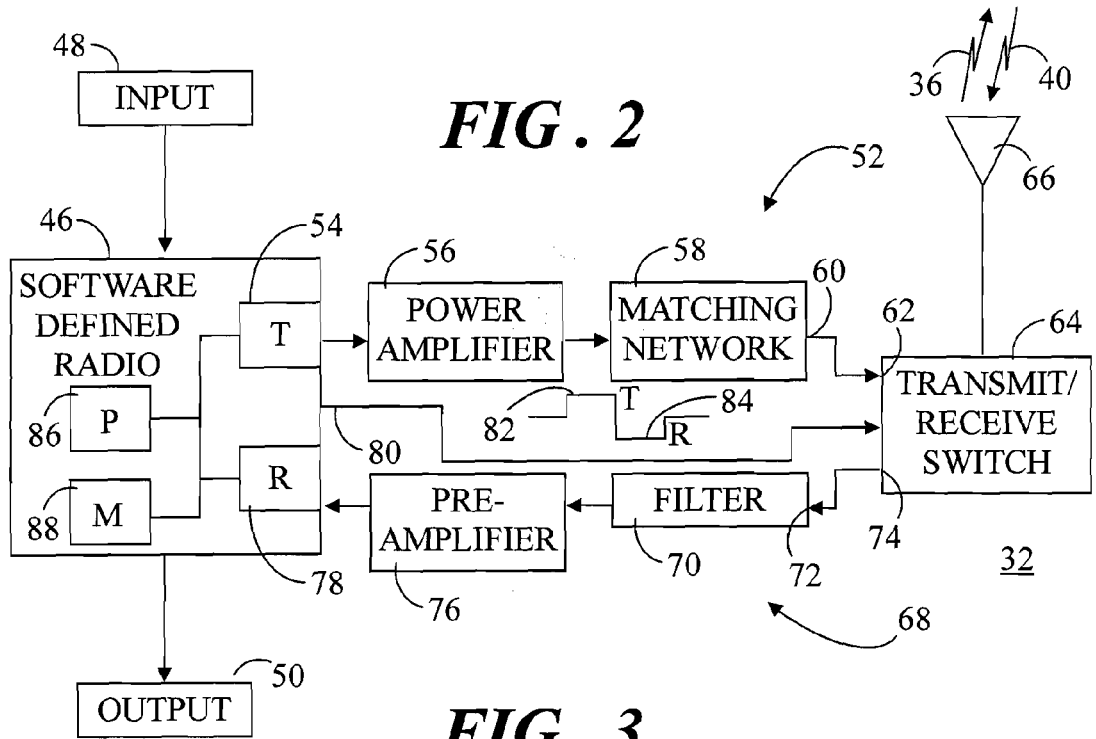
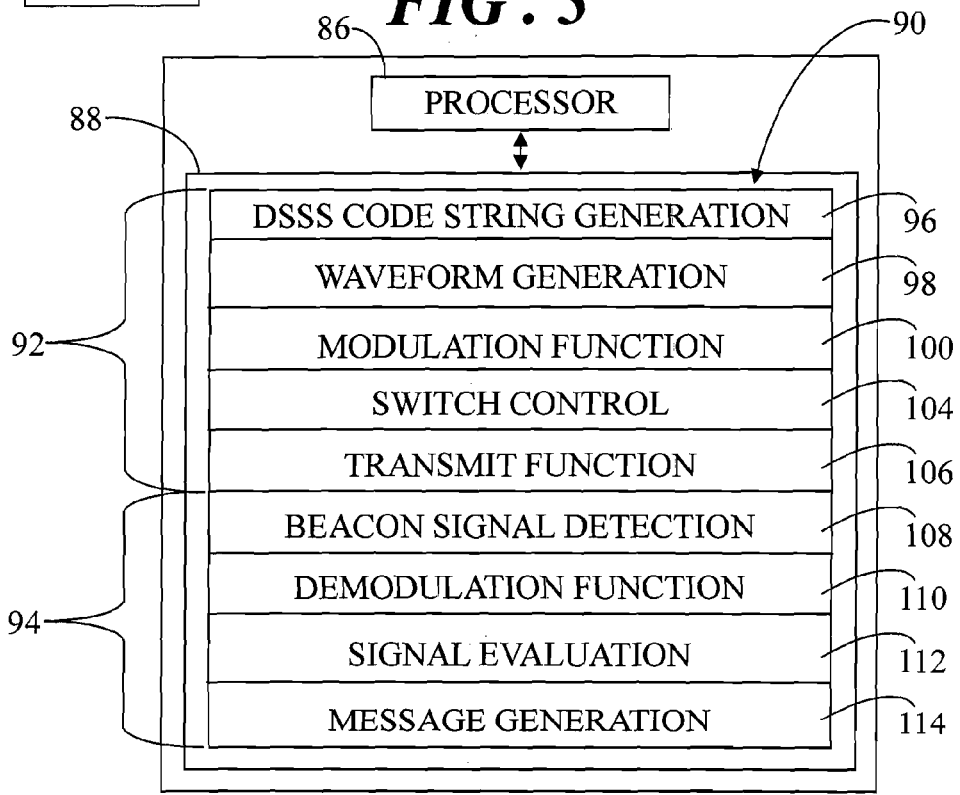

PN SEQUENCE(3)
PN SEQUENCE(2)

| SHIFT VALUE | PN SEQUENCE(1) |
|---|---|
| 0 | 101100100011011 |
| | |
| | SHIFTED PN SEQUENCE |
| 1 | 1101100100011 01 |
| 2 | 11 1011001000110 |
| 3 | 200   011 101100100011 |
| 4 | 1011 10110010001 |
| 5 | 11011 1011001000 |
| 6 | 011011 101100100 |
| 7 | 198   0011011 10110010 |
| 8 | 00011011 1011001 |
| 9 | 202   100011011 101100 |
| 10 | 0100011011 10110 |
| 11 | 00100011011 1011 |
| 12 | 100100011011 101 |
| 13 | 1100100011011 10 |
| 14 | 01100100011011 1 |

170 ⟶ (rows 3)
154 ⟶ (row 7)
160
172 ⟶ (row 9)

196

190

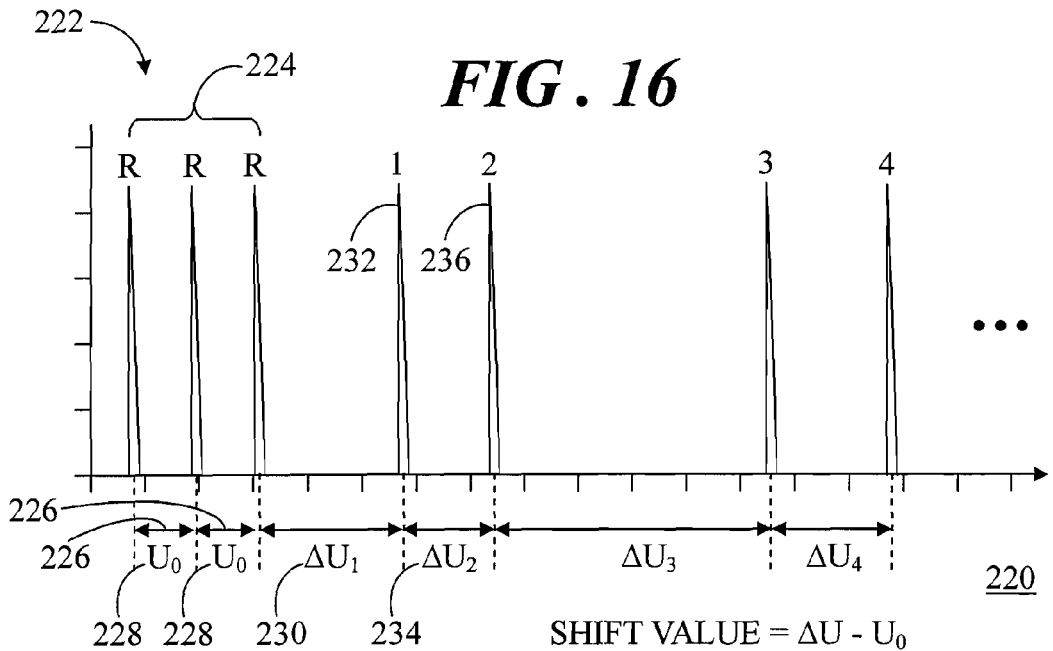

SYSTEM AND METHOD FOR COMMUNICATING IN A LOSSY ENVIRONMENT

TECHNICAL FIELD OF THE INVENTION

The present invention relates to the field of communication systems. More specifically, the present invention relates to a system and method using a spread spectrum methodology for communicating messages in a lossy environment.

BACKGROUND OF THE INVENTION

There is increasing demand for wireless radio frequency (RF) communications to operate reliably under non-ideal conditions, for example, in lossy environments in which the material properties of the environment cause attenuation or dissipation of the RF signals. These lossy environments include, for example, mines, underground caves and tunnels, bore holes, subways, large buildings, under water, and so forth where signal quality can be severely compromised. Currently there is limited ability to maintain communications in such lossy environments, thereby prohibiting the quick and effective deployment of wireless systems in such environments.

Recent tragic events and mining emergencies have highlighted the need for a reliable communications system between miners trapped inside the mine and the outside. Wire-based communications systems can be ineffective because they may fail due to exposure to fires, roof falls, explosions tearing down wires, power failure, and/or the like. Unfortunately, however, underground environments, such as mines, pose a particularly unique and hostile environment for radio signals because radio communication systems require a clear path or open air for signal propagation. Thus, stoppings or roof falls halt or impede conventional signal propagation.

Accordingly, systems that achieve improved penetration distance in a lossy environment, while concurrently achieving reduced cost, size, and weight are needed so that wireless communication systems can be more extensively and usefully employed.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 2 shows a block diagram of transceiver of the invention;

FIG. 3 shows a diagram of a software defined radio implementation of the transceiver of FIG. 2;

FIG. 11 shows an exemplary table of replica signals that may be stored at the transceiver of FIG. 2;

FIG. 16 shows chart containing a series of successive correlation peaks;

FIG. 17 shows a table of a series of successive shift values determined in accordance with the receive process of FIG. 10;

DETAILED DESCRIPTION

Embodiments of the invention entail a wireless communication system and associated methodology for enabling communication in a lossy environment. A lossy environment is one in which the material properties of the environment can cause attenuation or dissipation of conventional RF signals. These lossy environments include, for example, mines, underground caves and tunnels, bore holes, subways, large buildings, underwater, high electromagnetic noise environments, and so forth. The communication system and methodology implement a narrow bandwidth direct sequence spread spectrum (DSSS) code string for transmitting a message. The DSSS code string includes a multiplicity of shifted and unshifted pseudo-noise sequences. The values of the shifts form the data, i.e., the transmitted message. The narrow bandwidth can minimize frequency dependent dispersion and distortion experienced by existing systems, and this narrow bandwidth enables the utilization of higher gain, narrow band, antennas. In addition, the DSSS code string enables greater process gains for deeper penetration and range of radio frequency signals. A long, DSSS coded, narrow bandwidth signal advantageously enables the energy of the signal to be distributed over the entire DSSS code sequence so that peak power requirements of the transmitter can be greatly reduced. The relatively low peak power requirements of the system allow smaller and lighter components suitable for handheld, miniaturized, and robotic operations.

Figure 1:
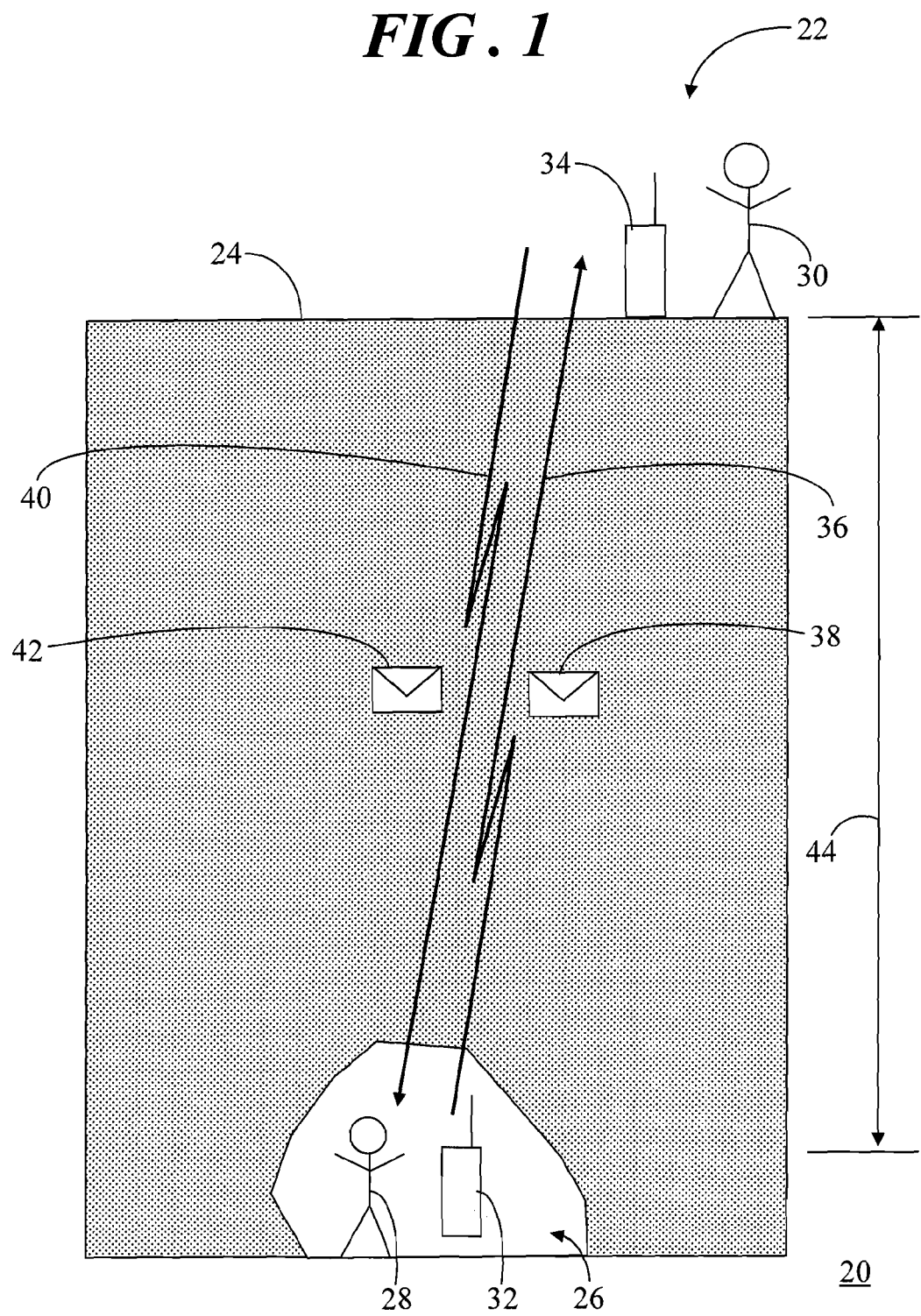
FIG. 1 shows a diagram of an environment in which a wireless communication system may be implemented in accordance with an embodiment of the invention.

FIG. 1 shows a diagram of an environment 20 in which a wireless communication system 22 may be implemented in accordance with an embodiment of the invention. In the exemplary scenario, environment 20 includes a surface 24 and a subsurface region 26 of the earth. In this illustration, subsurface region 26 may be a cave or a portion of a tunnel in, for example, a mine in which an individual 28 or individuals may be trapped. Under such a circumstance, it is essential that individual 28 communicate with personnel 30 at surface 24 as to his or her location, extent of injuries, food and water supplies, and so forth so that personnel 30 can perform appropriate rescue operations and provide guidance to individual 28 as to their required actions.

Accordingly, wireless communication system 22 includes at least a first transceiver 32 located at subsurface region 26 and operable by individual 28. System 22 further includes at least a second transceiver 34 located at surface 24 and operable by personnel 30. As will be discussed in significant detail herein, a beacon signal 36 is transmitted from first transceiver 32 for receipt at second transceiver 34. Beacon signal 36 can be used to communicate a message 38 from individual 28 to personnel 30. Likewise, a beacon signal 40 may be transmitted from second transceiver 34 for receipt at first transceiver 32. Beacon signal 40 may be used to communicate a message 42 from personnel 30 to individual 28. The particular modulation scheme for generating beacon signals 36 and 40 (discussed below) enables penetration of beacon signals 36 and 40 through environment 20 at least a predetermined penetration distance 44.

Transceivers 32 and 34 are described herein as being configured for two-way communication. In alternative embodiments, one of transceivers 32 and 34 may be only a transmitting device, and the other of transceivers 32 and 34 may be only a receiving device. In such a configuration, the transmitting device may be a sensor, camera, audio apparatus, or any other device configured to send data, e.g., message 38, to a receiving unit, automatically or controlled by individual 28. Transceivers 32 and 34 are described as being operable within environment 20 which entails a surface 24 and subsurface 26 regions of the earth for illustrative purposes. However, it should be readily apparent that transceivers 32 and 34 may be used in a multitude of lossy environments for enabling communication between a transmitting unit and a receiving unit. In addition, only two transceivers 32 and 34 are illustrated herein for simplicity. It should be understood, however, that wireless communication system 22 can include any number of transceivers sufficient to form a wireless communication network with their particular environment of use.

Referring to FIGS. 2-3, FIG. 2 shows a block diagram of first transceiver 32 of the present invention and FIG. 3 shows a diagram of a software defined radio implementation of first transceiver 32. In an embodiment, first and second transceivers 32 and 34 are configured similarly. As such, the description of first transceiver 32 applies equivalently to second transceiver 34 (FIG. 1). In the illustrated embodiment, first transceiver 32 generally includes a software defined radio (SDR) 46, an input device 48 in communication with SDR 46, and an output device 50 in communication with SDR 46.

Input device 48 can encompass buttons, switches, a keyboard, mouse, pointing device, audio device (e.g., a microphone), and/or any other device providing input to SDR 46. Output device 50 can encompass a display, a printer, an audio device (e.g., a speaker), and/or other devices providing output from SDR 46. Input and output devices 48 and 50 can also include network connections, modems, other devices used for communications with other transceiver devices and/or other computing devices or systems.

A transmitter portion 52 of first transceiver 32 includes a transmit output 54 of SDR 46 in communication with a power amplifier 56, which is in communication with a matching network element 58. An output 60 of matching network element 58 is in communication with a transmit input 62 of a transmit/receive switch 64. Transmit/receive switch 64 is in communication with an antenna system 66. A receiver portion 68 of first transceiver 32 includes a filter 70 having an input 72 in communication with a receive output 74 of transmit/receive switch 64. Filter 70 is in communication with a pre-amplifier 76, and pre-amplifier 76 is in communication with a receive input 78 of SDR 46.

Transmit/receive switch 64 is controlled by SDR 46 via a control link 80 to be in a transmit mode or a receive mode. For example, SDR 46 is configured to send a transmit enable signal 82 to switch 64 so that switch 64 is enabled to allow transmission of beacon signal 36, with its receive capability being disabled. Alternatively, SDR 46 can send a receive enable signal 84 to transmit/receive switch 64 so that switch 64 is enabled to allow receipt of beacon signal 40, with its transmit capability being disabled.

In general, SDR 46 generates beacon signal 36 and outputs beacon signal 36 via transmit output 54 to power amplifier 56 where beacon signal 36 is suitably amplified. Beacon signal 36 is output from power amplifier 56 to matching network element 58 where impedance matching is performed for the maximum transfer of power from the source to the load. Next, beacon signal 36 is communicated to transmit/receive switch 64. When transmit/receive switch 64 is in the transmit mode governed by transmit enable signal 82, beacon signal 36 is output from first transceiver 32 via antenna 66.

Following output of beacon signal 36, transmit/receive switch 64 may be switched to the receive mode as governed by receive enable signal 84 so that beacon signal 40 can be received at first transceiver 32. Beacon signal 40 detected at antenna 66 is communicated to transmit/receive switch 64. Next, beacon signal 40 is communicated from switch 64 to filter 70 in order to filter spurious signals and other noise. Beacon signal 40 is then communicated from filter 70 to pre-amplifier 76 which suitably amplifies or strengthens beacon signal 40 for processing. Following amplification, beacon signal 40 may be input at receive input 78 of SDR 46. SDR 46 may perform signal evaluation (discussed below) of the received beacon signal 40 in order to interpret message 42 (FIG. 1) carried by beacon signal 40. Of course, when second transceiver 34 (FIG. 1) receives beacon signal 36 transmitted from first transceiver 32, SDR 46 for second transceiver 34 will also perform signal evaluation of the received beacon signal 36 in order to interpret message 38 (FIG. 1) carried by beacon signal 36.

In an embodiment, processing, transmitting, and receiving functions of first transceiver 32 are implemented and controlled within SDR 46. A software defined radio system, such as SDR 46, is a radio communication system where components that have been typically implemented in hardware are instead implemented by means of software. As such, SDR 46 can provide software control of its functions, such as wide- or narrow-band operation, modulation techniques, security functions, analog-to-digital and digital-to-analog conversions, and so forth. Such a design produces a radio system which can receive and transmit widely different radio protocols (i.e., waveforms) based solely on the software used. Furthermore, the relationship between data rate, communications range, power, covertness, and so forth can be optimized for a given communications link prior to or in real time by implementing a software defined radio approach.

SDR 46 may include a main board, sometimes referred to as a motherboard, and one or more daughter-boards acting as extensions to the motherboard that cover different input/output frequencies, and so forth. The motherboard, daughter-boards, and any other processor capability is represented in SDR 40 by a processor 86. As mentioned above, components that have typically been implemented in hardware are instead implemented by means of software in SDR 46. Thus, SDR 46 further includes a memory element 88 that is in communication with processor 86.

Memory element 88 has executable code 90 stored therein, that instructs processor 86 to perform a number of operations pertinent to the function of transceiver 32. Memory element 88 may be any volatile or non-volatile mass storage system readable by processor 86. Memory element 88 may also include cooperating or interconnected computer readable media, which exist exclusively on SDR 46 or are distributed among multiple interconnected computing systems (not shown) that may be local or remote.

Executable code 90 can include a transmit process 92 and a receive process 94. In an exemplary scenario, transmit process 92 can include software code modules that perform DSSS code string generation 96, waveform generation 98, modulation functions 100, switch control 104, and transmit functions 106. Receive process 94 can include software code modules that perform beacon signal detection 108, demodulation functions 110, signal evaluation functions 112, and message generation functions 114.

Those skilled in the art will recognize that the software functions performed by SDR 46 can vary from that which is shown and can be organized differently from that which is shown. Furthermore, although embodiments are described herein as being implemented in a software defined radio architecture, various functions of first transceiver 32 can alternatively be implemented in hardware. Additionally, as mentioned above, one of transceivers 32 and 34 may be only a transmitting device, and the other of transceivers 32 and 34 may be only a receiving device. In such a configuration, transmitter portion 52 may not be co-located with receiver portion 68.

Figure 4:
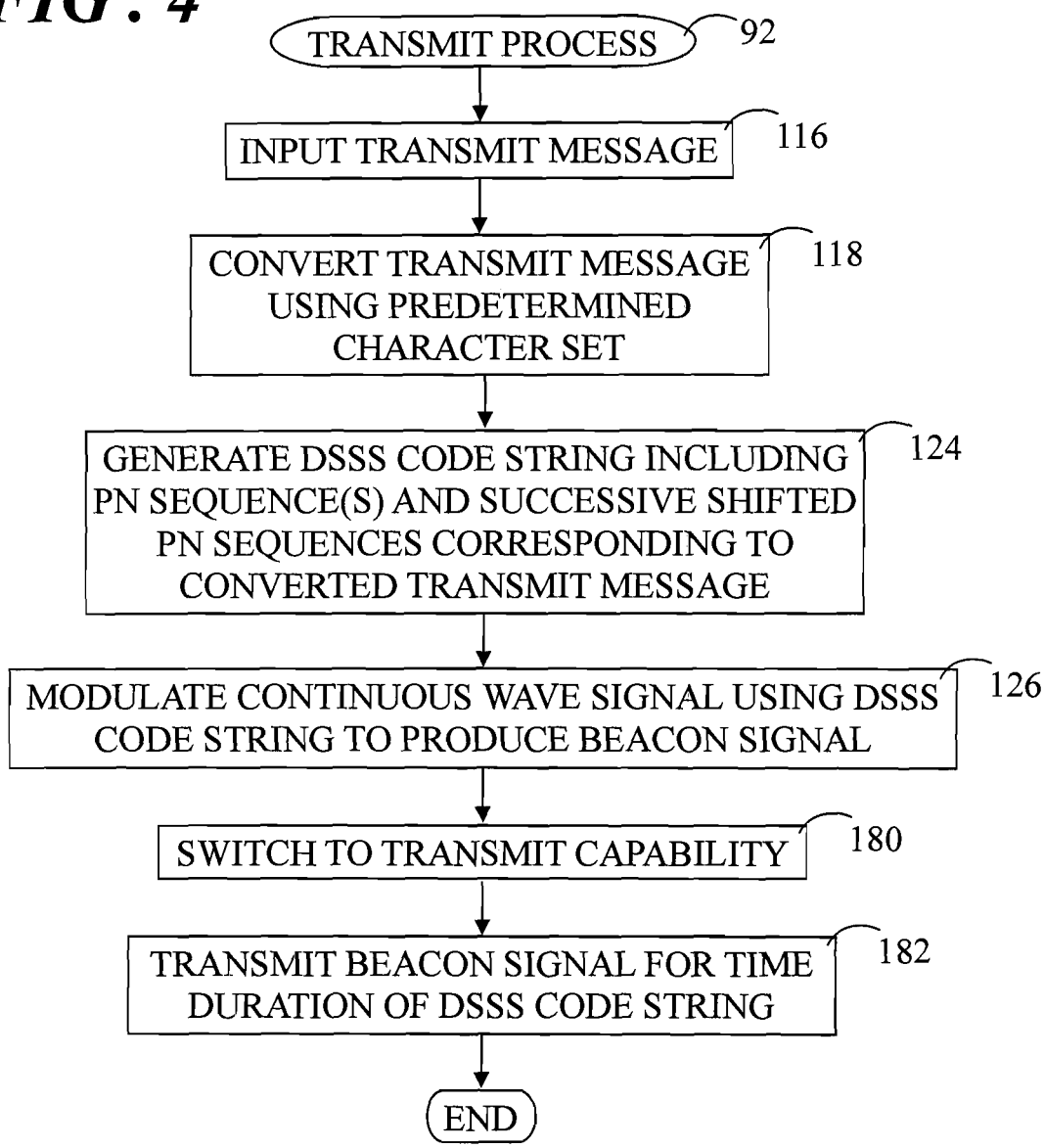
FIG. 4 shows a flowchart of a transmit process performed in accordance with an embodiment.

FIG. 4 shows a flowchart of transmit process 92 performed in accordance with an embodiment. In general, transmit process 92 is executed by any of the transceivers, e.g. first and second transceivers 32 and 34 (FIG. 1), in wireless communication system 22 (FIG. 1) in order to generate a beacon signal, e.g. beacon signals 36 and 40 (FIG. 1), using spread spectrum techniques, to communicate messages, e.g., messages 38 and 42 (FIG. 1), within lossy environment 20 (FIG. 1). In this example, transmit process 82 is executed at first transceiver 32 (FIG. 1) to communicate message 38 via beacon signal 36 to second transceiver 34 (FIG. 1).

Transmit process 92 begins with a task 116. At task 116, first transceiver 32 receives an input message intended for transmission. That is, individual 28 inputs message 38 to be transmitted into first transceiver 32 via input 48 (FIG. 2). Message 38 may be input by typing on a keyboard, speaking into a microphone, keying a touchpad, and any other known and upcoming forms of data entry.

A task 118 is performed in connection with task 116. At task 118, the input message 38 is encoded or otherwise converted into a code suitable for information exchange. By way of example, an alphanumeric set of characters that make up message 38 may be encoded using a predetermined character-encoding scheme such as the American Standard Code for Information Interchange (ASCII). ASCII codes represent text in computers, communications equipment, and other devices that use text.

Figure 5:
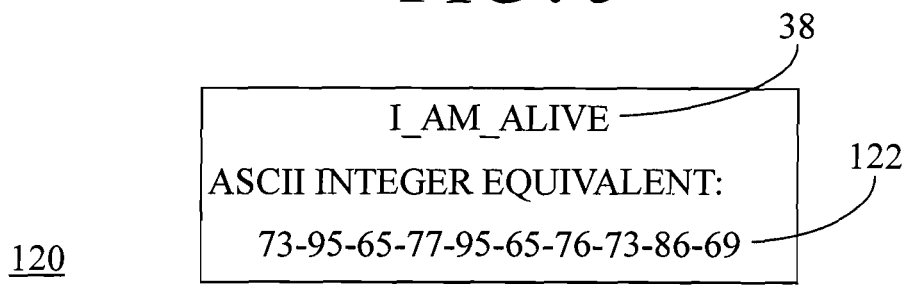
FIG. 5 shows a diagram of message for transmission within a wireless communication system that has been converted in accordance with a predetermined character set.

Referring to FIG. 5 in connection with task 118, FIG. 5 shows a diagram 120 of message 38 converted in accordance with a predetermined character set. In this example, message 38 entails text entered by individual 28 that pronounces "I_AM_ALIVE." Message 38 is converted to an ASCII integer equivalent of message 38, i.e., a converted transmit message 122, in accordance with the well known ASCI character-encoding scheme. Although ASCII character-encoding is described herein, other known character-encoding schemes, binary code, or custom character sets may be implemented in alternative embodiments. In still other alternative embodiments, message 38 may be text, a predefined text string, a picture, image, audio, sensor data (e.g., biological, atmospheric, industrial), or any other data that may be converted to binary bits.

With reference back to FIG. 4, following task 118, transmit process 92 continues with a task 124. At task 124, a direct sequence spread spectrum (DSSS) code string is generated including pseudo-noise (PN) sequences and successive shifted PN sequences that correspond to converted transmit message 122 (FIG. 5).

A task 126 is performed in connection with task 124. At task 126, a signal waveform is modulated using the DSSS code string to produce beacon signal 36 (FIG. 1).

Figure 6:
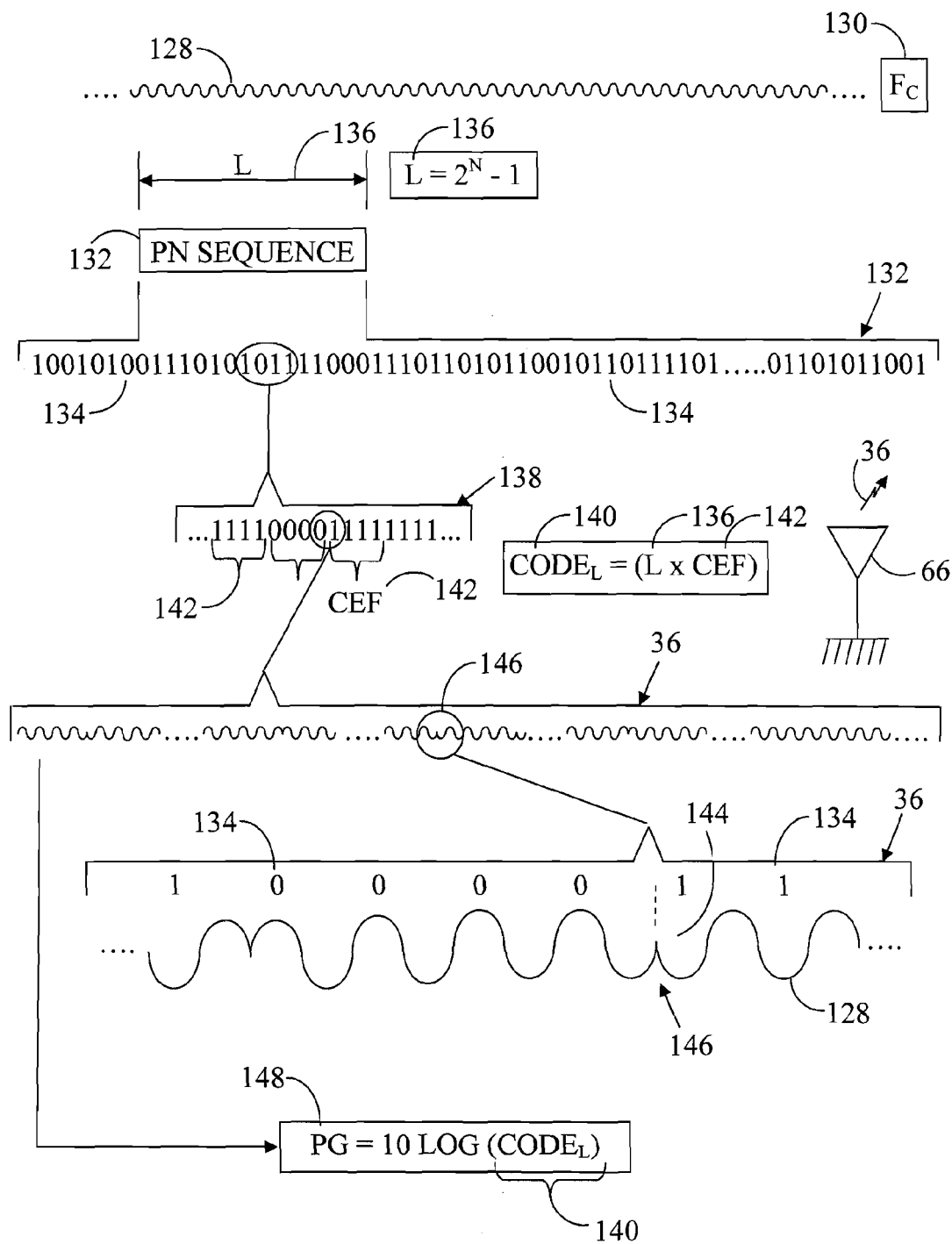
FIG. 6 shows a diagram of a direct sequence spread spectrum (DSSS) implementation of the present invention.

Referring to FIG. 6 in connection with tasks 124 and 125, FIG. 6 shows a diagram of a direct sequence spread spectrum (DSSS) implementation of the present invention. DSSS is a spread spectrum technique in which the transmitted signal is spread out in the time-domain, while the pulse bandwidth and amplitude is reduced in the frequency-domain. A receiver compresses this time sequence back into a pulse, hence the often-used term of pulse compression. DSSS code is used to phase-modulate a continuous wave signal, e.g., a sine wave, pseudorandomly with a continuous string of pseudo-noise (PN) code symbols, typically referred to as "chips." This continuous string of PN chips is referred to as a pseudo-noise (PN) sequence. Because of the low power density inherent in spread spectrum modulation, recovery of baseband information from the spread spectrum signal can be accomplished only through correlating the received signal (plus noise) with an exact replica of the transmitted signal. A spread-spectrum receiver can use non-coherent demodulation, matched filtering, and stacking to detect the known signal buried in noise. This signal processing method permits signal detection in high noise or lossy environments.

As shown in FIG. 6, a continuous wave signal 128, for example, a sine wave, is provided. Continuous wave signal 128 may be generated at SDR 46 (FIG. 3) by executing waveform generation software code module 98 (FIG. 3) of executable code 90 (FIG. 3). Of course in alternative embodiments, continuous wave signal 128 may be provided via a hardware oscillator (not shown). Continuous wave signal 128 exhibits a frequency 130, $F_c$, that can be any of various useable carrier frequencies for continuous wave signal 128, for example, 1 Hz, 3 kHz, 250 MHz, 500 MHz, 1 GHz, 5 GHz, and so forth.

FIG. 6 further illustrates an exemplary pseudo-noise (PN) sequence 132. In accordance with task 124 of transmit process 92 (FIG. 4), PN sequence 132 may be generated at SDR 46 through execution of DSSS code string process 96 (FIG. 3) of executable code 80 (FIG. 3). Alternatively, one or more PN sequences 132 may be stored in memory 88 one of which may be accessed through execution of DSSS code string process 96. In an embodiment, PN sequence 132 is based on a maximal-length, binary sequence (m-sequence) of chips 134. A chip 134 is the fundamental unit of PN sequence 132 and can be either a one (1) or a zero (0). Thus, PN sequence 132 includes a sequence of ones and zeros (chips 134) which can be generated by a linear feedback shift register of length, N. This sequence of chips 134 is referred to as a "pseudo-noise" sequence because they are similar to noise and satisfy one or more of the standard tests for statistical randomness.

A sequence length 136, L, of PN sequence 132 is related to the number of chips 134 in PN sequence 132, expressly, sequence length 136 is $2^N-1$ "chips" 134 long, where N is the number of stages in the linear feedback shift register. An arrangement of the feedback taps of the linear feedback shift register establish the deterministic PN sequence 132 produced. Hence, different PN sequences 132 of the same sequence length 136 have a very low cross correlation product and are said to be orthogonal. For brevity, only a portion of PN sequence 132 is shown, where additional chips 134 of PN sequence 132 are represented by ellipses located within PN sequence 132.

In conventional DSSS for communication systems, a data signal that is intended for transmission is coded or modulated by a DSSS code, e.g., PN sequence 132, and this combined DSSS signal output can then be used to modulate a carrier wave, e.g., continuous wave signal 128. However, in an embodiment, continuous wave signal 128, and hence modulated beacon signal 36, is absent a data signal component. That is, no separate data signal is being transmitted. Under such a circumstance, continuous wave signal 128 may be referred to as a zero payload carrier signal. Instead, beacon signal 36 is only a function of PN sequence 132 and continuous wave signal 128. Accordingly, beacon signal 36 is a signal that is sometimes referred to as a "beacon" and first and second transceivers 32 and 34 (FIG. 1) operate in "beacon mode." However, as will become apparent below, message 38 (FIG. 1) is effectively communicated as a function of PN sequence 132 despite the absence of a separate data signal.

In an embodiment, PN sequence 132 may be expanded to produce a direct sequence spread spectrum (DSSS) code 138 that will be used in phase shift modulating continuous wave signal 128. For brevity, only a small portion of DSSS code 138 is shown, where additional chips 134 of DSSS code 138 are represented by ellipses located on opposing ends of DSSS code 138. In accordance with a preferred embodiment, DSSS code 138 has a code length 140, $CODE_L$, that is a function of sequence length 136 of PN sequence 132 and a chip expansion factor 142. Chip expansion factor 142 defines a number of cycles of continuous wave signal 128 used to represent each chip 134 in PN sequence 132, and may be an integer number that is preferably greater than one. Said another way, each chip 134 in PN sequence 132 may be represented by multiple cycles of continuous wave signal 128, as specified by chip expansion factor 142. Chip expansion factor 142 is applied to PN sequence 132 to yield DSSS code 138 of a particular code length 140.

As presented in FIG. 6 for illustrative purposes, chip expansion factor 142 is shown as being the integer number four (4). Chip expansion factor 142 is applied to PN sequence 132 by successively replicating each chip 134 in PN sequence 132 by chip expansion factor 142 to yield DSSS code 138. In this example, each instance of chip 134 that is the binary digit "1" in PN sequence 132 is expanded to four (4) chips 134 of the binary digit "1" in DSSS code 138. Likewise, each instance of chip 134 that is the binary digit "0" in PN sequence 132 is expanded to four (4) chips 134 of the binary digit "0" in DSSS code 138. In this example, chip expansion factor 142 is four (4) cycles of continuous wave signal 128 per chip 134 of PN sequence 132. Thus, code length 140 of DSSS code 138 is four times greater than sequence length 136 of PN sequence 132.

In accordance with task 126, DSSS code 138 (characterized by PN sequence 132 and expanded by chip expansion factor 142) is used to modulate continuous wave signal 128 by, for example, phase-shift keying. Phase-shift keying is a digital modulation scheme that typically conveys data by changing, or modulating, the phase of a reference signal (the carrier wave). As illustrated in FIG. 6, each chip 134 of DSSS code 138 can be either the binary digit "1" or the binary digit "0." The change from a "0" chip 134 to a "1" chip 134, and the change from a "1" chip 134 to a "0" chip 134, is represented by a phase change 144 in continuous wave signal 128. A phase change 144 from "0" chip 134 to "1" chip 134 is presented in an enlarged view 146 of beacon signal 36 for illustrative purposes. Phase-shift keying is described herein for illustrative purposes. However, other higher-order phase-shift keying/digital modulation schemes may be implemented in alternative embodiments.

Process gain (also referred to as "processing gain") of the system is defined by the cross-correlation magnitude between the received data and a replica of the PN sequence. It can also be viewed as the ratio of the magnitude of cross correlation peak with respect to the noise floor in the correlation function. The cross correlation magnitude is dependent on the number of carrier cycles in a single sequence. The noise floor is established by calculating a moving average of sample points in the correlation function, which are at least 6 dB below the cross correlation peak. The greater the number of sample points in the moving average window, the better the approximation of noise floor. Typical sizes are five to ten sample points. Additionally, the pseudo-noise characteristics of a PN sequence will also provide some noise cancelation. This is especially true for narrow bandwidth signals where this noise becomes close to Gaussian. In accordance with an embodiment, each of the transceivers (second transceiver 34 in this example) uses a sliding correlator, i.e., a matched filter, at SDR 46 to search for PN sequence 132 in the received signal, e.g., beacon signal 36. When PN sequence 132 is matched perfectly (in time) with a replica signal (discussed below) most of the energy in PN sequence 132 is added coherently, forming the auto-correlation function peak (referred to hereinafter as a correlation peak). The height of the correlation peak compared to the non-peak is process gain. Thus, the process gain can be viewed as a signal to noise ratio at the receiver as the height of the correlation peak, i.e. the signal to noise ratio after the dispreading operation in which PN sequence 132 is removed.

As further shown in FIG. 6, a process gain 148, PG, can be expressed as a function of code length 1140 of DSSS code 138, where code length 140 is a product of sequence length 136 of PN sequence 132 and chip expansion factor 142. That is, process gain 148 is $10 \log(CODE_L)$ expressed in decibels, dB, where code length 140, $CODE_L$, is (L×CEF). Accordingly, process gain 148 is a function of both sequence length 136 and chip expansion factor 142.

PN sequence 132 can theoretically have unlimited sequence length 136. Typical values for sequence length 136 are one thousand twenty three (1023) or two thousand forty seven (2047) chips 134 long. Furthermore, chip expansion factor 142 is preferably selected to be greater than one such that a bandwidth of beacon signal 36 is approximately equal to frequency 130 divided by chip expansion factor 142. In an example, sequence length 136 of two thousand forty seven (2047) chips 134 and chip expansion factor 142 of five hundred and twelve (512) cycles per chip 134 yields process gain 148 of sixty (60) decibels.

In the software defined radio approach of communication system 22 (FIG. 1), process gain 148 can be dynamically controlled via sequence length 136 and chip expansion factor 142 from one transmitted beacon signal 36 to the next transmitted beacon signal 36. That is, sequence length 136 of PN sequence 132 and/or chip expansion factor 142 can be advantageously varied to provide sufficient process gain 148 so as to enable penetration of beacon signal 36 though lossy environment 20 (FIG. 1) at desired penetration distances 44 (FIG. 1).

Figure 7:
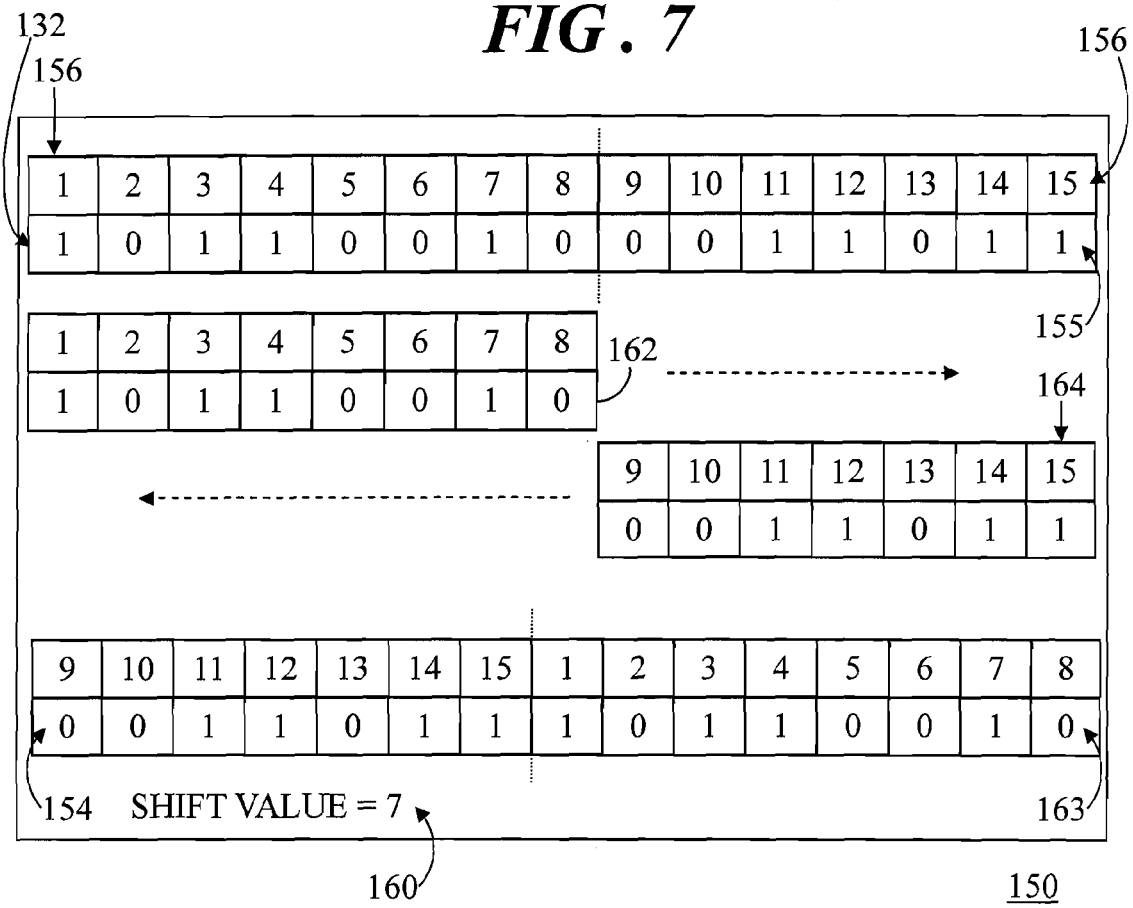
FIG. 7 shows a diagram of a scheme for modulating correlation peaks in accordance with an embodiment of the present invention.

Referring now to FIG. 7, FIG. 7 shows a diagram 150 of a scheme for modulating correlation peaks in accordance with an embodiment of the present invention. As mentioned above, the transceivers of communication system 22 use a sliding correlator, i.e., a matched filter, at SDR 46 to search for PN sequence 132 in the received signal, e.g., beacon signal 36. When PN sequence 132 is matched perfectly (in time) with a replica signal, most of the energy in PN sequence 132 is added coherently, forming a correlation peak. In accordance with a particular embodiment, a DSSS code string 152 (see FIG. 9) is generated in accordance with task 124 (FIG. 4) of transmit process 92 (FIG. 4). DSSS code string 152 includes a multiplicity of shifted and unshifted PN sequences 132. The values of the shifts form the data, i.e., the transmitted message 38. That is, the shifted occurrence of PN sequence 132 will result in a correlation peak that is shifted in time relative to a correlation peak generated from the unshifted, or original, PN sequence 132.

Diagram 150 provides an illustrative example of how PN sequence 132 is manipulated to form a shifted PN sequence 154. In this example, PN sequence 132 has sequence length 136 (FIG. 6) of fifteen and chip expansion factor 142 (FIG. 6) of one. As such DSSS code 138 (FIG. 6) for this example has a code length 140 (FIG. 6) of fifteen. As discussed in connection with FIG. 6, however, chip expansion factor 142 may be greater than one so that code length 140 is a product of both sequence length 136 and chip expansion factor 142 of greater than one. Nevertheless, principles of the invention apply equivalently to conditions in which the code length 140 is proportionately greater than sequence length 136 because the original PN sequence 132 expanded by chip expansion factor 142 simply increases process gain 148 (FIG. 6) but does not affect the position of the correlation peaks.

In this example, each of the fifteen chips 134 of PN sequence 132 is illustrated in a first order 155 associated with a chip order designator 156 of one through fifteen. Additionally, a reference position 158 for PN sequence 132, i.e., the first chip 134, of PN sequence 132 is associated with chip order designator 156 labeled "1." A determination is made that a shift value 160 of seven (7) is required. In order to cause a correlation peak to shift in time (discussed below), a first portion 162 of consecutive chips 134 in PN sequence 132 beginning at reference position 158 are removed from PN sequence 132. First portion 162 is appended to an end 164 of the remainder of PN sequence 132 to produce shifted PN sequence 154 that includes the fifteen chips 134 of PN sequence 132 arranged in a second order 163. In this example, first portion 162 includes eight (8) consecutive chips 134 starting from reference position 158, and the remainder of PN sequence 132 is equivalent to shift value 160 of seven (7) in the PN sequence 132 having sequence length 136 of fifteen chips 135. Accordingly, chip order designators 156 (and the associated chips 134) formerly in the order of one through fifteen are now in second order 163 of nine through fifteen followed by one through eight in shifted PN sequence 154. In accordance with an embodiment, each shift value 160 is greater than zero up to sequence length 136.

Figure 8:
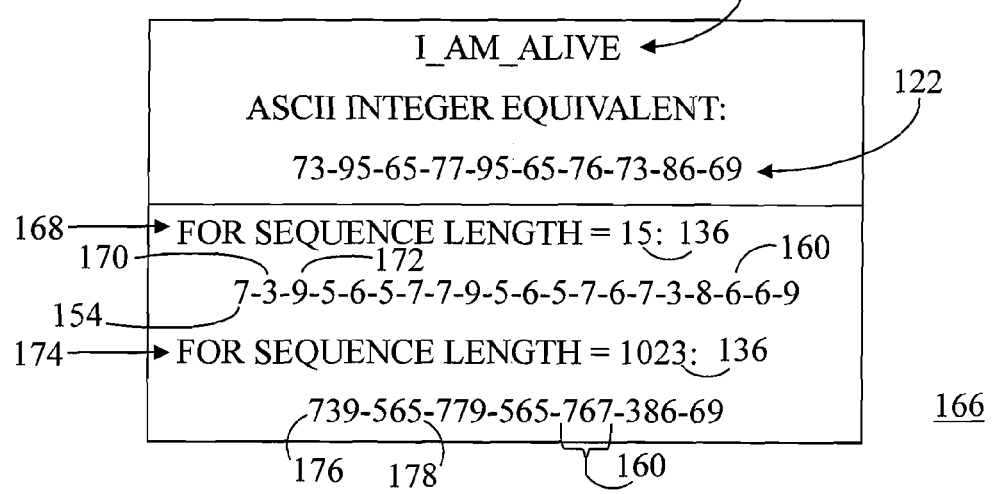
FIG. 8 shows a diagram of a message that may be generated using the modulation scheme of FIG. 6 and the shift scheme for modulating correlation peaks of FIG. 7.

FIG. 8 shows a diagram 166 of message 38 that may be generated using the modulation scheme shown in FIG. 6 and using the shift scheme for modulating correlation peaks shown in FIG. 7. It should be recalled that message 38 entails text entered by individual 28 that pronounces "I_AM_ALIVE," and message 38 is converted to converted transmit message 122, i.e., the ASCII integer equivalent of message 38.

In a first example 168 in which sequence length 136 is fifteen (15), shifted PN sequence 154 is a first shifted sequence 154 having shift value 160 of seven (7), a second shifted PN sequence 170 was generated having shift value 160 of three (3), a third shifted PN sequence 172 was generated having shift value 160 of nine (9), and so forth. That is, each shift value 160 is greater than zero and up to sequence length 136 of fifteen (15). Successive shift values 160 of seven (7) and three (3) for first and second shifted sequences 154 and 170 can be combined to form the ASCII integer of "73" representing the text letter "I." Likewise, shift values 160 of successive shifted PN sequences can be combined to form the remaining ASCII characters of "95," "65," and so forth that represent the text letters of the original message 38.

In a second example 174 in which sequence length 136 is one thousand twenty three (1023), a first shifted PN sequence 176 may have a shift value 160 of seven hundred thirty nine (739), a second shifted PN sequence 178 might have shift value 160 of five hundred sixty five (565), and so forth. The first two integers of first shifted PN sequence 176 form the ASCII character "73" representing the text letter "I," the third integer of first shifted PN sequence 176 and the first integer of second shifted PN sequence 178 form the ASCII character "95" representing an underscore "_" and so forth representing the original message 38.

Figure 9:
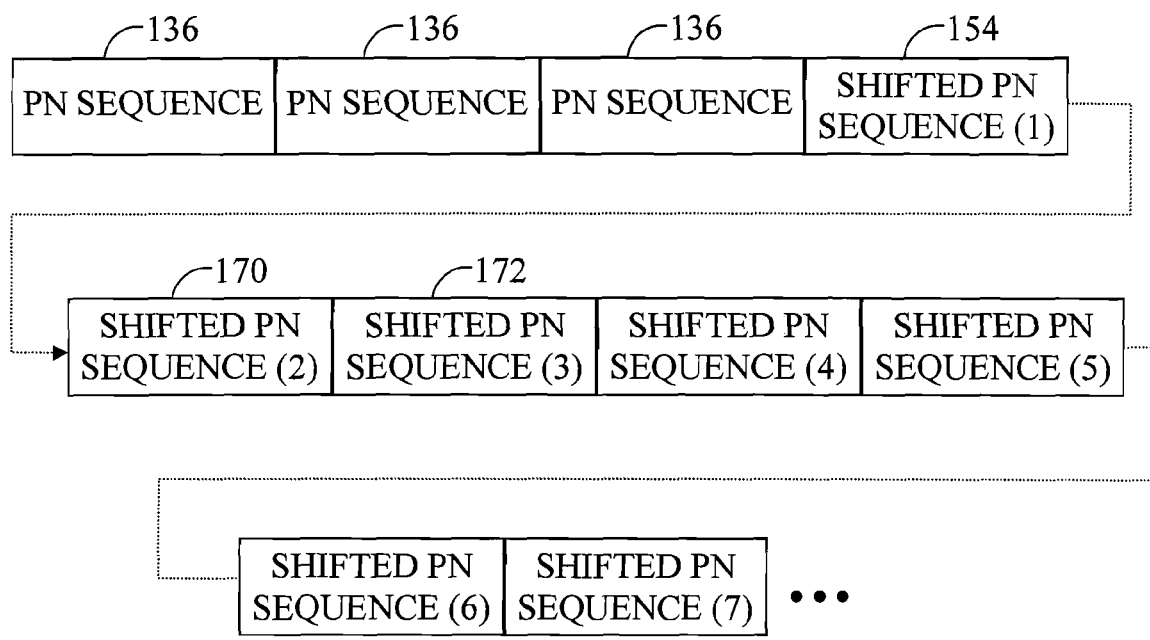
FIG. 9 shows a simplified exemplary DSSS code string generated in order to transmit a message between transceivers in the environment of FIG. 1.

FIG. 9 shows a simplified illustration of exemplary DSSS code string 152 generated in order to transmit message 38 between transceivers 32 and 34 in lossy environment 20 (FIG. 1). DSSS code string 152 is formed in accordance with execution of generation task 124 (FIG. 4) of transmit process 92 (FIG. 4). DSSS code string includes at least two, and in this example three, unshifted PN sequences 136. Unshifted PN sequences 136 are followed by a plurality of successive shifted PN sequences, e.g., first shifted PN sequence 154, second shifted PN sequence 170, third shifted PN sequence 172, and so forth. Of course each of PN sequences 136, 154, 170, 172, and so forth may be expanded by chip expansion factor 142 (FIG. 6) so as to increase process gain 148 (FIG. 6).

Returning now to transmit process 92, DSSS code string 152 (FIG. 9) is utilized at task 126 to modulate continuous wave signal 128, as discussed above.

Following task 126, transmit process 92 continues with a task 180. At task 180, first transceiver 32 (FIG. 2) is switched to transmit capability and receive capability is disabled. For example, transmit enable signal 82 (FIG. 2) may be generated at SDR 46 and communicated to transmit/receive switch 64 (FIG. 2) via control link 80 (FIG. 2) by executing switch control code module 104 (FIG. 3) of executable code 90 (FIG. 3).

Process control continues with a task 182. At task 182, beacon signal 36 (FIG. 2) is transmitted for a time duration sufficient to output at least a single instance of DSSS code string 152 (FIG. 9). Transmission of beacon signal 36 may be performed at transmitter portion 52 (FIG. 2) of first transceiver 32 through execution of transmit function code module 106 (FIG. 3) of executable code 90 (FIG. 3). Execution of task 182 can result in a single instance of transmission of DSSS code string 152 or multiple instances of DSSS code string 152 for redundancy. Following task 182, transmit process 92 exits.

It should be understood that other tasks not related expressly to transmission of DSSS code string 152 may occur prior to exiting transmit process 92. For example, following transmission of beacon signal 36 at task 182, first transceiver 32 (FIG. 1) may be switched to receive capability and transmit capability may be disabled so that first transceiver 32 can receive a response, in the form of message 42 (FIG. 1) from second transceiver 34 (FIG. 1). In an embodiment, receive enable signal 84 (FIG. 2) may be generated at SDR 46 of first transceiver 32 and communicated to transmit/receive switch 64 (FIG. 2) via control link 80 (FIG. 2) by executing switch control code module 104 (FIG. 3) of executable code 90 (FIG. 3).

Figure 10:
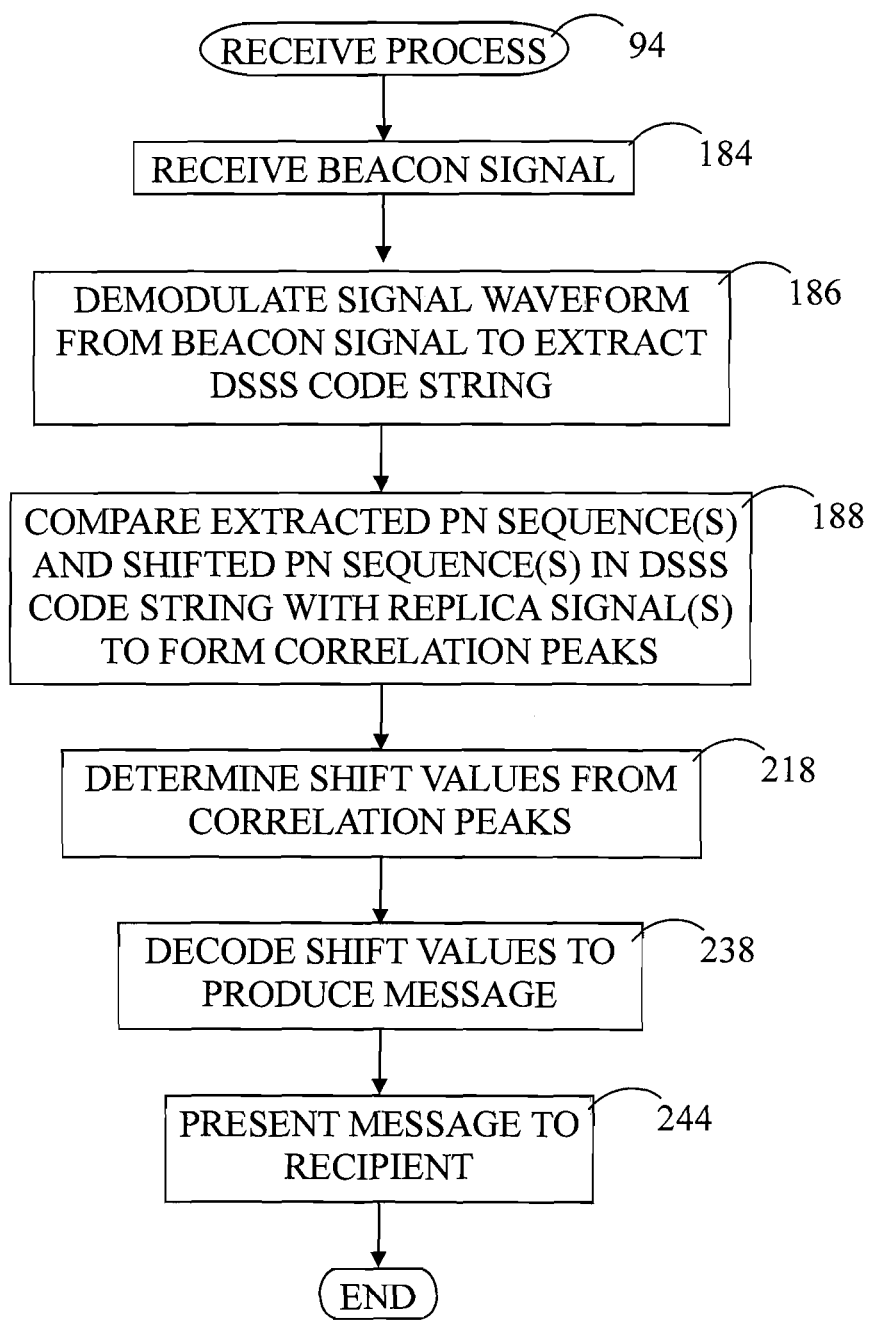
FIG. 10 shows a flowchart of a receive process performed in accordance with an embodiment.

FIG. 10 shows a flowchart of receive process 94 performed in accordance with an embodiment. In general, receive process 94 is executed by any of the transceivers, e.g. first and second transceivers 32 and 34 (FIG. 1) in wireless communication system 20 (FIG. 1) to evaluate a transmitted beacon signal, e.g. beacon signals 36 and 40 (FIG. 1), in order to ascertain a particular message sent from another transceiver within wireless communication system 20. In order to maintain continuity with the above described transmit process 82, receive process 94 is executed at second transceiver 34 (FIG. 1) to receive message 38 communicated via beacon signal 36 from first transceiver 32 (FIG. 1).

Receive process 94 begins with a task 184. At task 184, second transceiver 34 detects and receives beacon signal 36 (FIG. 2) transmitted from first transceiver 32. In an embodiment, second transceiver 34 may be set to receive capability, with transmit capability disabled, whenever it is not currently transmitting beacon signal 40. At task 184, beacon signal detection module 108 (FIG. 3) of executable code 90 (FIG. 3) may be executed to implement receive task 184.

In response to task 184, receive process continues with a task 186. At task 186, the received beacon signal 36 is demodulated in order to extract DSSS code string 152 (FIG. 9) from beacon signal 36. At task 186, demodulation function code module 110 (FIG. 3) of executable code 90 (FIG. 3) may be executed to implement demodulation task 186. For example, at second transceiver 34 (FIG. 1), beacon signal 36 is demodulated to extract DSSS code string 152 (FIG. 9) from continuous wave signal 128 (FIG. 6) so that the two or more PN sequences 132 and the one or more shifted PN sequences 154, 170, 172 contained in DSSS code string 152 can be evaluated.

Following demodulation task 186, receive process 94 continues with a task 188. At task 188, the two or more PN sequences 132 and the one or more shifted PN sequences 154, 170, 172 contained in DSSS code string 152 are compared with a replica signal to form correlation peaks. At task 188, signal evaluation code module 112 (FIG. 3) of executable code 90 (FIG. 3) may be executed to implement comparison task 188. For example, a sliding correlator function may be used to detect the presence of PN sequence 132 in the demodulated DSSS code string 152.

In accordance with an embodiment, each of the transceivers (second transceiver 34 in this example) uses a sliding correlator, i.e., a matched filter, at SDR 46 to search for a particular PN sequence 132 in the demodulated received signal, e.g., DSSS code string 152. Thus, second transceiver 34 must have a priori knowledge of the one or more specific PN sequences that may be utilized by first transceiver 32 for modulating continuous wave signal 128 (FIG. 6). For programming efficiencies, PN sequence 132 and/or a plurality of PN sequences may be stored in memory 88 (FIG. 2) of second transceiver 34 (FIG. 2).

Referring to FIG. 11 in connection with task 188, FIG. 11 shows an exemplary table 190 of a replica signals 192 that may be stored at transceiver 34. Table 190 represents a compilation of replica signals, in the form of a plurality of PN sequences 192, that may be used by the transceivers, e.g. first and second transceivers 32 and 34, to generate DSSS code string 152 at the transmitting unit. Hence, this same plurality of PN sequences 192 can be utilized by the receiving unit to perform comparisons with PN sequences in the received DSSS code string 152.

A first replica signal 194 that is an exact replica of PN sequence 132 (FIG. 7) is shown in table 190. Additional replica signals 196 representing each possible shift value 160 are associated with first replica signal 194 in table 190. As such, replica signals 196 represent each shifted PN sequence that is possible given the initial PN sequence replica signal 194. For example, it should be readily observed that first shifted PN sequence 154 having shift value 160 of seven (7) is represented by a first shifted replica signal 198, second shifted PN sequence 170 having shift value 160 of three (3) is represented by a second shifted replica signal 200, and third shifted PN sequence 172 having shift value 160 of nine (9) is represented by a third shifted replica signal 202, and so forth.

With continued reference to FIGS. 10 and 11, the sliding correlator function at transceiver 34 evaluates the demodulated DSSS code string 152 (FIG. 9) to detect of one replica signals 192 stored in table 190. When a received PN sequence, i.e., PN sequence 132, is matched perfectly (in time) with its replica signal 194 all of the energy in PN sequence 132 is added coherently, forming a correlation peak. The height of the correlation peak compared to the non-peak represents the process gain. Thus, the process gain can be viewed as a signal to noise ratio at the receiver as the height of the correlation peak, i.e. the signal to noise ratio after the despreading operation in which PN sequence 132 is removed. In an embodiment, a series of three unshifted PN sequences 132 may be transmitted in DSSS code string 152 in order to initialize the receiving unit, e.g., transceiver 34, and to provide a reference lock or a reference position. All subsequent shifted PN sequences, e.g., first shifted PN sequence 154, second shifted PN sequence 170, third shifted PN sequence 172, and so forth, are shifted from this reference position. This feature will be discussed in connection with FIGS. 16 and 17.

Figure 12:
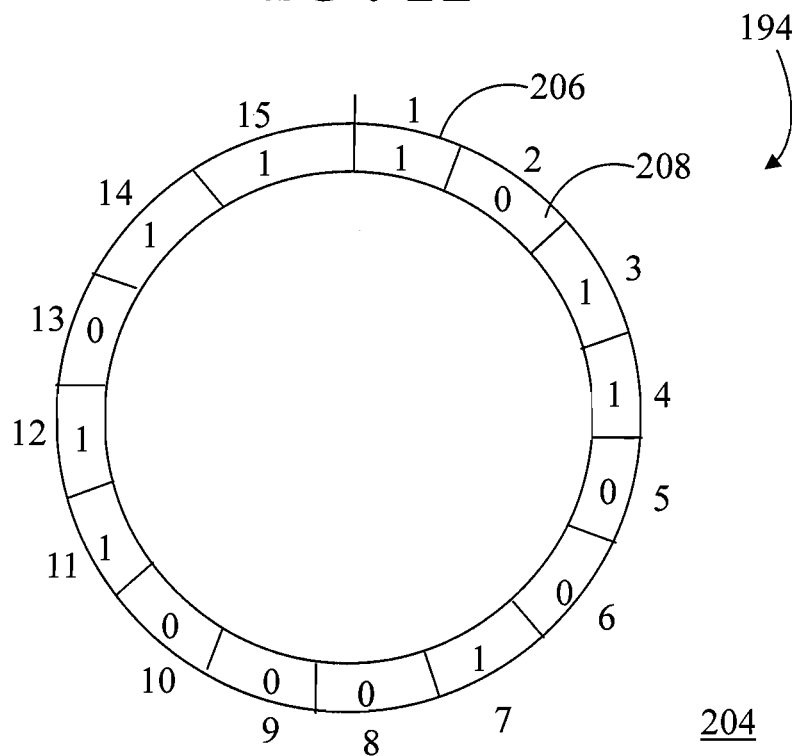
FIG. 12 shows a diagram of an exemplary circular buffer of a pseudo-noise (PN) sequence replica signal stored at a receiver.

Referring now to FIGS. 12-15, FIGS. 12-15 provide a correlation example for more clearly visualizing the shift value concept of the present invention. FIG. 12 shows a diagram of an exemplary circular buffer 204 of PN sequence replica signal 194 stored at the receiving unit, e.g., transceiver 34. For continuity of discussion, PN sequence replica signal 194 is an exact match of PN sequence 132 (FIG. 7). For illustrative purposes PN sequence replica signal 194 can be visualized as a fifteen element circular buffer filled with ones and zeros. Successive buffer slots of circular buffer 204 hold successive digits of PN sequence replica signal 194. For example, a first buffer slot 206 holds the first digit of PN sequence replica signal 194, a second buffer slot 208 holds the second digit of PN sequence replica signal 194, and so forth.

Figure 13:
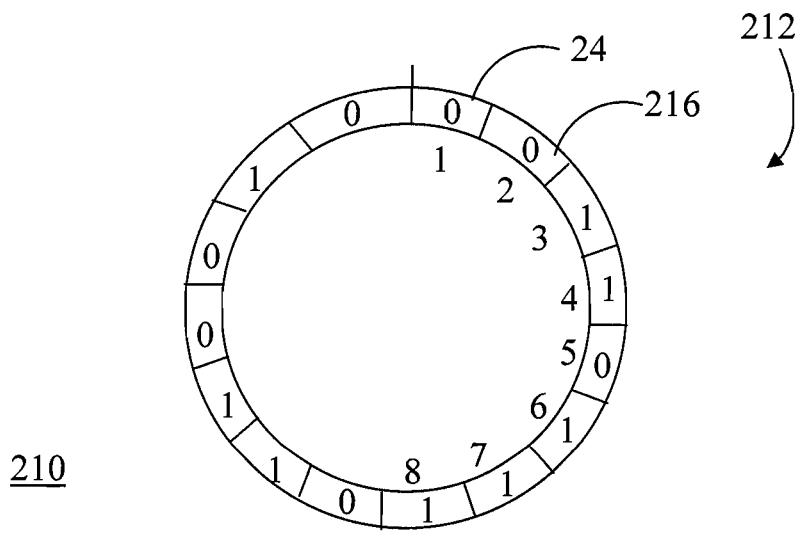
FIG. 13 shows a diagram of an exemplary circular buffer of a sequence of data received at the receiver.

FIG. 13 shows a diagram of an exemplary circular buffer 210 of a sequence 212 of data received at the receiving unit, i.e. transceiver 34. For illustrative purposes sequence 212 can also be visualized as a fifteen element circular buffer filled with ones and zeros. Successive buffer slots of circular buffer 210 hold successive digits of sequence 212. For example, a first buffer slot 214 holds the first digit of sequence 212, a second buffer slot 216 holds the second digit of sequence 212, and so forth.

Figure 14:
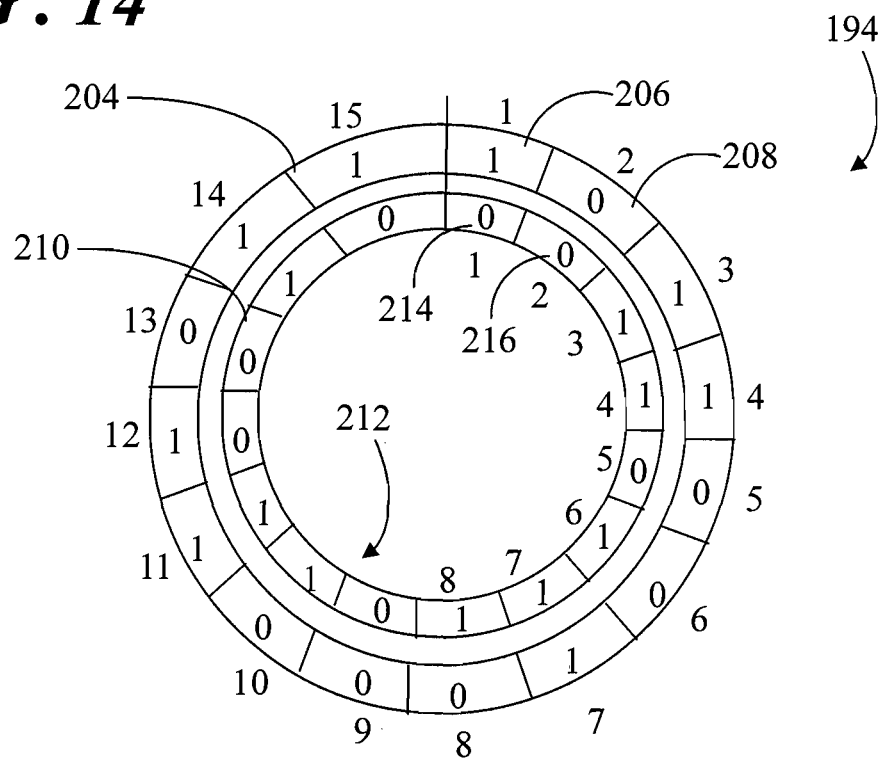
FIG. 14 shows a diagram of the exemplary circular buffers of FIGS. 12 and 13 to illustrate a shift between the PN sequence replica signal and the sequence of received data.

FIG. 14 shows a diagram of exemplary circular buffers 204 and 210 to illustrate a shift between PN sequence replica signal 194 and sequence 212 of received data. As can be readily ascertained, every digit of sequence 212 in each successive buffer slot of circular buffer 210 does not line up with every digit of PN sequence replica signal 194 in each successive buffer slot of circular buffer 204. A determination can be made as to how much circular buffer 204 should be "rotated" to align with sequence 212 of received data in circular buffer 210.

Figure 15:
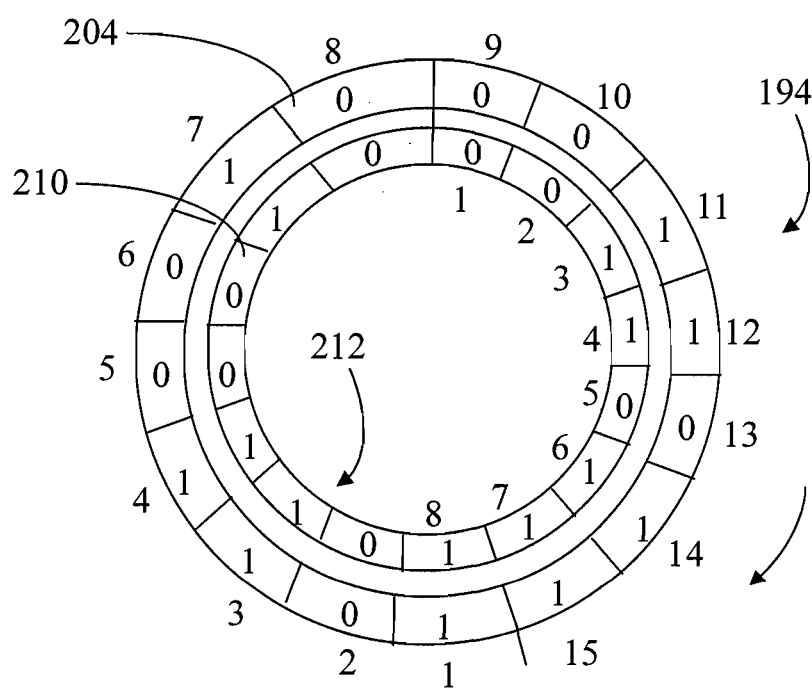
FIG. 15 shows a diagram of the exemplary circular buffers of FIGS. 12 and 13 correlated to determine a shift value between the PN sequence replica signal and sequence of received data.

FIG. 15 shows a diagram of exemplary circular buffers 204 and 210 correlated to determine a shift value 160 between the PN sequence replica signal 194 and sequence 212 of received data. As shown, when circular buffer 204 containing PN sequence replica signal 194 is rotated seven (7) units, an exact match is found. Accordingly, shift value 160 in this example is seven (7).

Returning back to receive process 94, following task 188 in which correlation peaks are formed through the implementation of the correlation function, i.e., matched filtering, receive process 94 continues with a task 218. At task 218, shift values 160 can be determined from the correlation peaks.

Referring to FIG. 16 in connection with task 188, FIG. 16 shows a chart 220 containing a series of successive correlation peaks 222. Correlation peaks 222 are formed as discussed above for each of the PN sequences 132 and successive shifted PN sequences 154, 170, 172, and so forth in DSSS code string 152 (FIG. 9). A series of three correlation peaks 222 are reference peaks 224 that correspond to the three unshifted PN sequences 132 transmitted via beacon signal 36 (FIG. 2) from the transmitting unit, i.e., first transceiver 32. A distance 226 between successive reference peaks 224 corresponds to a reference position 228, labeled $U_o$. All subsequent correlation peaks 222 are shifted from reference position 228 by an amount corresponding to one of shift values 160.

In the illustrated embodiment, a distance 230, labeled $\Delta U_1$, between a first shifted correlation peak 232, labeled "1," and an immediately preceding reference peak 224 is subtracted by reference position 228 to obtain shift value 160 of seven (7). A distance 234, labeled $\Delta U_2$, between first shifted correlation peak 232 and a second shifted correlation peak 236, labeled "2" is subtracted by reference position 228 to obtain shift value 160 of three (3), and so forth. Accordingly, the position of each correlation peaks 222 can be "modulated" in the receiving unit, i.e., transceiver 34, by rearranging the PN sequence 132 (FIG. 7) used to form DSSS code string 152 (FIG. 9) at the transmitting unit, i.e., transceiver 32.

In an alternative embodiment, shift value 160 may be determined as being the difference between a distance between two shifted correlation peaks 222 and the distance between the immediately preceding shifted correlation peaks 22. This distance can be expressed as shift value=$\Delta U_n - \Delta U_{n-1}$.

As shown in chart 220, each of correlation peaks 222 is generally the same height. Such a circumstance occurs when chip expansion factor (CEF) 142 (FIG. 6) is constant for each of the PN sequences 132 and successive shifted PN sequences 154, 170, 172, and so forth in DSSS code string 152 (FIG. 9). A constant CEF 142 reduces computational complexity at the receiving unit. Nevertheless, in alternative embodiments, CEF 142 may be varied in accordance with particular communication requirements.

Referring back to receive process 94 (FIG. 10), following a determination of successive shift values 160 at task 218, program control continues with a task 238. At task 238, the shift values 160 determined at task 218 are decoded to produce the received message, i.e., message 38 (FIG. 1), transmitted from transceiver 32 (FIG. 1) and received at transceiver 34 (FIG. 1).

Referring to FIG. 17 in connection with task 238, FIG. 17 shows a table 240 of series 242 of successive shift values 160 determined in accordance with task 218 (FIG. 10) of receive process 94 in order to construct the transmitted message, i.e., message 38. Shift values 160 can be suitably combined as discussed in connection with FIG. 8 to represent the ASCII integer equivalent of message 38, i.e., converted transmit message 122. This ASCII integer equivalent can then be readily decoded to reconstruct the original text of message 38 which in this example is the original "I_AM_ALIVE" text. Of course, message 38 may additionally include an end of message identifier (not shown) indicating that the complete message 38 has been transmitted.

Referring back to receive process 94, following decoding task 238, program control continues with a task 244. At task 244, message 38 can be presented to the recipient, e.g., individual 30 (FIG. 1) managing transceiver 34, via output 50 (FIG. 2). Following task 244, receive process 94 exits.

The above described embodiment provides a communication technique in which three unshifted PN sequences 132 (FIG. 6) transmitted via beacon signal 36 (FIG. 2) from the transmitting unit, i.e., first transceiver 32, are utilized to obtain reference peaks 224 (FIG. 16) which can subsequently be utilized to determine reference position, $U_o$, 228. In alternative embodiments, successive correlation peaks 222 (FIG. 16) may include correlation peaks corresponding to a conventionally utilized common code PN sequence that alerts a receiver to the initiation of a transmitted message 38. Following the common code correlation peaks, one or more identifier correlation peaks may be determined that identify a particular individual 28 (FIG. 1) or a particular transmitting unit, i.e. first transceiver 32. For example, the receiving unit may contain a database of particular PN sequences 132 (FIG. 6), each of which identifies one of individuals 28. A particular individual or transmitting unit may then be appropriately identified as the source of message 38. Subsequent correlation peaks 222 may then be either shifted PN sequences of the common code PN sequence or the particular PN sequence identifying the individual. In either instance, shift values can be determined and decoded to produce message 38.

The above described embodiment is a communication technique for a single data channel. As such, this communication technique may be considered a single code single frequency technique, where the term "single code" refers to a situation in which single PN sequence is utilized to generate the DSSS code string and the term "single frequency" refers to the situation in which a single frequency channel is utilized for transmission. In alternative embodiments, however, the same PN sequence may be utilized to transmit DSSS code strings on multiple frequency channels. Such an approach is effective because each frequency channel in the transmission scheme can have a very narrow bandwidth. Such a multiple channel communication technique may be considered a single code multiple frequency technique where each of the multiple narrow band frequency channels are separated by a guard band.

In another alternative embodiment, multiple DSSS code strings may be transmitted on a single frequency channel, where each DSSS code string is generated utilizing a different PN sequence. This is an effective approach due to the orthogonality of the PN sequences. As mentioned above, an arrangement of the feedback taps of the linear feedback shift register establish the deterministic PN sequence produced. Hence, different PN sequences of the same sequence length have a very low cross correlation product and are said to be orthogonal. Consequently, when the orthogonal PN sequences strings are added together, the resulting signal has the characteristics of all of the individual orthogonal PN sequences (although amplitude of each can vary). In order to keep the transmit power level a constant, the amplitude of the resultant (i.e., the sum of the individual PN sequences) can be scaled down by a factor of "n" where "n" is the number of orthogonal PN sequences.

Figure 18:
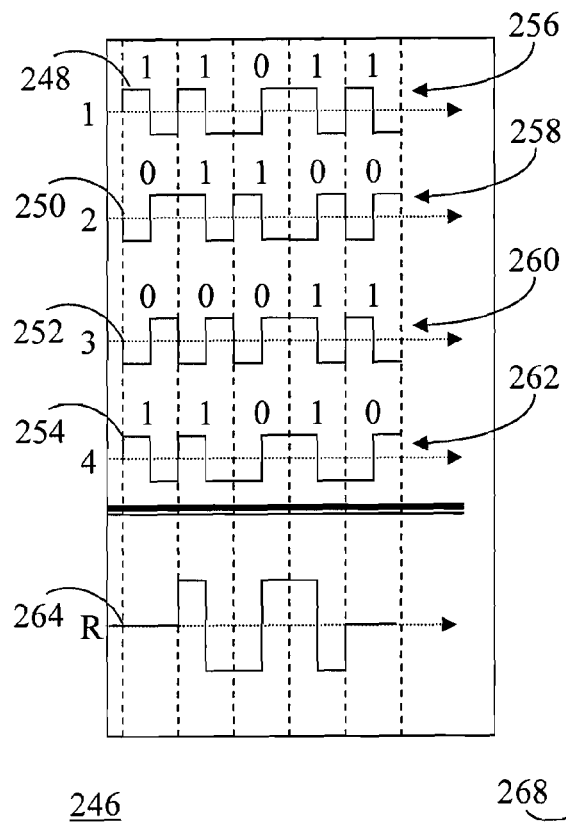
FIG. 18 shows a chart illustrating a summation of PN sequences exemplifying a scheme for transmission of multiple DSSS code strings on a single frequency channel.

FIG. 18 shows a chart 246 illustrating a summation of PN sequences exemplifying a scheme for transmission of multiple DSSS code strings on a single frequency channel. In this example, chip expansion factor 142 (FIG. 6) is a value of one, and continuous wave signal 128 (FIG. 6) is a square continuous wave signal in lieu of the sinusoidal continuous wave signal illustrated in FIG. 6. A square continuous wave signal is commonly utilized in base band transmitters because the square wave can be easier to generate from a digital device.

Chart 246 includes a first modulated waveform 248, a second modulated waveform 250, a third modulated waveform 252, and a fourth modulated waveform 254. Each of waveforms 248, 250, 252, 254 is modulated by their respective PN sequence(s) and shifted PN sequences(s) utilized to generate their respective DSSS code strings. For example, first modulated waveform 248 is modulated by a first DSSS code string 256, second modulated waveform 250 is modulated by a second DSSS code string 258, third modulated waveform 252 is modulated by a third DSSS code string 260, and fourth modulated waveform 254 is modulated by a fourth DSSS code string 262. Each of DSSS code strings 256, 258, 260, and 262 is generated as discussed in detail above.

In this example, waveforms 248, 250, 252, 254 are added together to form a resultant waveform 264 that will be transmitted from the transmitting unit, e.g., transceiver 32 (FIG. 1), for receipt at a receiving unit, e.g., transceiver 34 (FIG. 1). This transmission scheme may be considered code division single frequency wherein the term "code division" represents the multiple orthogonal PN sequences used to form the DSSS code strings and the term "single frequency" represents the single frequency channel used for transmission. Accordingly, a single message 38 (FIG. 1) may be split into subcomponents and transmitted via multiple DSSS code strings as shift values 160 (FIG. 7).

Figure 19:
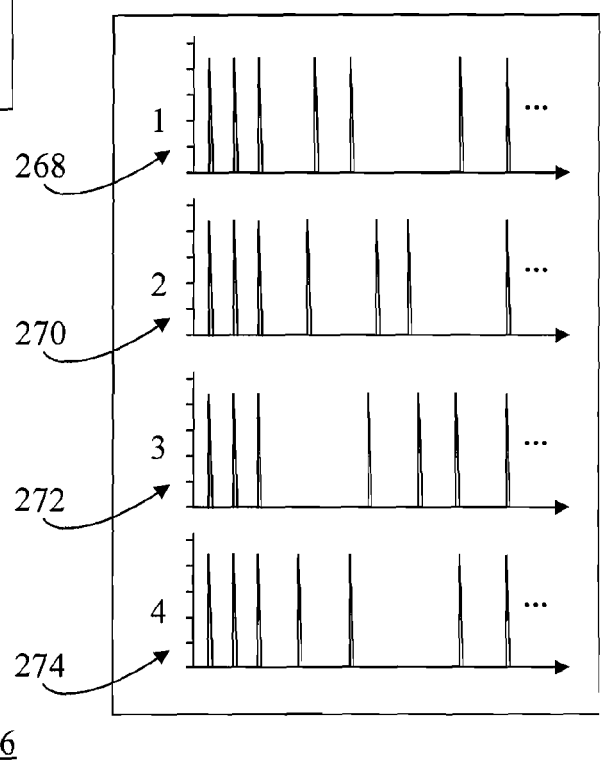
FIG. 19 shows a chart of multiple correlation peaks formed in accordance with the multiple DSSS code strings transmitted via a resultant waveform.

Referring to FIG. 19 in connection with FIG. 18, FIG. 19 shows a chart 266 of multiple correlation peaks formed in accordance with the multiple DSSS code strings transmitted via resultant waveform 264 (FIG. 18). Chart 266 provides a first set of correlation peaks 268 formed at the receiving unit in response to first DSSS code string 256, a second set of correlation peaks 270 formed at the receiving unit in response to second DSSS code string 258, a third set of correlation peaks 272 formed at the receiving unit in response to third DSSS code string 260, and a fourth set of correlation peaks 274 formed at the receiving unit in response to fourth DSSS code string 262. Shift values 160 (FIG. 7) can be readily determined from each set of correlation peaks 268, 270, 272, and 274 as discussed in detail above. These shift values 160 can subsequently be decoded, and can be used to produce the transmitted data, e.g., message 38 (FIG. 1).

Implementation of a code division single frequency transmission scheme results in greater data transmission rates than a single code single frequency approach. For example, the data rate is equivalent to the quantity of code channels (in this example, four) multiplied by the data rate of the single frequency channel. This concept can be expanded when multiple frequency channels are used for transmission. In such an instance, the data rate is equivalent to the quantity of code channels (in this example, four) multiplied by the data rate of a single frequency channel and multiplied by the number of frequency channels used for transmission.

However, adding waveforms 248, 250, 252, and 254 together can result in a penalty, i.e., a reduction in process gain 148 (FIG. 6) of approximately two or three decibels for each additional frequency channels. Thus, it may be advantageous to increase process gain 148 through implementation of chip expansion factor 142 (FIG. 6), as discussed in detail above.

In an example, if a single frequency channel has a data rate of thirty-two kilobits per second (32 kbps), and five (5) waveforms modulated by five DSSS code strings are used, then the data rate would by 32×5, or 160 kbps. In another example, if a single frequency channel has a data rate of thirty-two kilobits per second (32 kbps), and five (5) waveforms modulated by five DSSS code strings are used, and ten (10) frequency channels are used, then the data rate would be 32×5×10, or 1.600 Mbps (megabits per second). Thus, code division and multiple frequency channel techniques can be readily implemented with the spread spectrum methodology described herein to accommodate the transmission of large data files, pictures, audio, and so forth.

In summary, the present invention teaches a wireless communication system and associated methodology for enabling communication in a lossy environment in which the material properties of the environment can cause attenuation or dissipation of conventional RF signals. The communication system and methodology implement a narrow bandwidth direct sequence spread spectrum (DSSS) code string for transmitting a message. The DSSS code string includes a multiplicity of shifted and unshifted pseudo-noise sequences. The values of the shifts can be decoded to form the data, i.e., the transmitted message. The narrow bandwidth can minimize frequency dependent dispersion and distortion experienced by existing systems, and this narrow bandwidth enables the utilization of higher gain, narrow band, antennas. In addition, the DSSS code string enables greater process gains for deeper penetration and range of radio frequency signals. A long, DSSS coded, narrow bandwidth signal advantageously enables the energy of the signal to be distributed over the entire DSSS code sequence so that peak power requirements of the transmitter can be greatly reduced. The relatively low peak power requirements of the system allow smaller and lighter components suitable for handheld, miniaturized, and robotic operations. In addition, the relationship between data rate, communications range, power, covertness, and so forth can be readily optimize for a give communications link prior to or in real time by implementing a software defined radio approach.

Although the preferred embodiments of the invention have been illustrated and described in detail, it will be readily apparent to those skilled in the art that various modifications may be made therein without departing from the spirit of the invention or from the scope of the appended claims. For example, the process steps discussed herein can take on great number of variations and can be performed in a differing order then that which was presented. Additionally, although a software defined radio implementation is discussed herein, the present invention can be adapted to encompass a hardware implementation or a combination of a software/hardware implementation.

What is claimed is:

1. A method of communicating a message between a transmitter and a receiver comprising:

generating a direct sequence spread spectrum (DSSS) code string that includes at least one instance of a pseudo-noise (PN) sequence followed by a shifted PN sequence, said PN sequence including a plurality of chips arranged in a first order, said shifted PN sequence including said plurality of chips arranged in a second order, said shifted PN sequence being produced in response to said message;

transmitting a beacon signal from said transmitter toward a receiver, said beacon signal being modulated by said DSSS code string;
receiving said beacon signal at said receiver in response to said transmitting operation;
forming correlation peaks at said receiver, one each of said correlation peaks being associated with one each of said at least one instance of said PN sequence and said shifted PN sequence in said beacon signal;
determining a shift value from said correlation peak associated with said shifted PN sequence; and
decoding said shift value to produce said message.

2. A method as claimed in claim 1 wherein:
each of said PN sequence and said shifted PN sequence exhibits a sequence length;
said generating operation comprises expanding said each of said PN sequence and said shifted PN sequence so that said each of said PN sequence and said shifted PN sequence in said DSSS code string has a code length that is greater than said sequence length; and
said method further comprises modulating a continuous wave signal by inserting said DSSS code string into said continuous wave signal to produce said beacon signal.

3. A method as claimed in claim 2 wherein said continuous wave signal is a carrier signal that is absent a data signal component.

4. A method as claimed in claim 2 wherein said continuous wave signal is characterized by a frequency of cycles of a periodic waveform, and said expanding operation comprises:
selecting a chip expansion factor to define a number of said cycles of said continuous wave signal per said chip in said each of said PN sequence and said shifted PN sequence; and
said expanding operation comprises applying said chip expansion factor to each of said chips in said each of said PN sequence and said shifted PN sequence to produce said code length.

5. A method as claimed in claim 1 wherein said PN sequence is a maximum length sequence (m-sequence) of said chips.

6. A method as claimed in claim 1 wherein said generating operation comprises arranging said plurality of chips in said second order, said arranging operation including:
establishing a reference position for said PN sequence;
removing a first portion of consecutive ones of said plurality of chips in said PN sequence beginning at said reference position; and
appending said first portion of said consecutive chips to an end of said PN sequence to produce said shifted PN sequence.

7. A method as claimed in claim 1 wherein said forming operation comprises:
comparing said received beacon signal to a replica signal characterized by said PN sequence to form said correlation peaks;
identifying a first value as a first distance between said correlation peaks associated with said at least one instance of said PN sequence;
identifying a second value as a second distance between said one of said correlation peaks associated with said shifted PN sequence and a preceding one of said correlation peaks associated with said PN sequence; and
computing a difference between said second value and said first value to determine said shift value.

8. A method as claimed in claim 7 wherein said first distance is a first quantity of said chips, said second distance is a second quantity of said chips, and:
said computing operation computes said difference as a third quantity of said chips, said third quantity being expressed as an integer value; and
said decoding operation comprises converting said integer value into at least a portion of said message.

9. A method as claimed in claim 8 wherein said converting operation comprises converting said integer value into a character within said message using a predetermined character set.

10. A method as claimed in claim 1 wherein:
said generating operation comprises generating said DSSS code string to include a plurality of successive shifted PN sequences following said at least one instance of said PN sequence, each of said successive shifted PN sequences including said plurality of chips arranged in an order that differs from said first order, said shifted PN sequence being a first one of said successive shifted PN sequences; and
said forming operation comprises forming additional ones of said correlation peaks associated with said each of said successive shifted PN sequences, and determining a successive plurality of shift values for said additional ones of said correlation peaks, one each of said shift values being associated with one each of said successive shifted PN sequences; and
said decoding operation comprises decoding each of said successive shift values to yield a string of characters that produce said message.

11. A method as claimed in claim 10 wherein said forming operation further comprises:
expressing said successive shift values as successive integer values;
converting said successive integer values into said string of characters within said message using a predetermined character set.

12. A method as claimed in claim 1 wherein said DSSS code string is a first DSSS code string, said PN sequence is a first PN sequence, said shifted PN sequence is a first shifted PN sequence, said correlation peaks are a first set of said correlation peaks, and said method further comprises:
generating a second DSSS code string that includes a second PN sequence followed by a second shifted PN sequence, said second PN sequence including a second plurality of chips arranged in a third order, said second shifted PN sequence including said second plurality of chips arranged in a fourth order;
said transmitting operation transmitting said beacon signal modulated by both of said first and second DSSS code strings;
said forming operation forming a second set of correlation peaks in response to said second DSSS code string to determine at least a second shift value; and
said decoding operation additionally decodes said second shift value, wherein both of said first and second shift values are used to produce said message.

13. A method as claimed in claim 12 further comprising modulating a continuous wave signal by inserting both of said first and second DSSS code strings into said continuous wave signal to produce said beacon signal.

14. A communication system comprising:
a first processor;
a first memory element in communication with said first processor, said first memory element having first executable code stored therein, said first executable code instructing said first processor to generate a direct sequence spread spectrum (DSSS) code string that includes at least two sequential instances of a pseudo-noise (PN) sequence followed by an instance of a shifted PN sequence, said PN sequence including a plurality of chips arranged in a first order, said shifted PN sequence including said plurality of chips arranged in a second order, wherein said generating includes arranging said plurality of chips in said second order by establishing a reference position for said PN sequence, removing a first portion of consecutive ones of said plurality of chips in said PN sequence beginning at said reference position, and appending said first portion of said consecutive chips to an end of said PN sequence to produce said shifted PN sequence, said shifted PN sequence being produced in response to said message;

a transmitter in communication with said first processor, said transmitter being configured to transmit a beacon signal, said beacon signal being modulated by said DSSS code string;

a receiver configured to receive said beacon signal;

a second processor in communication with said receiver;

a second memory element in communication with said second processor, said second memory element having second executable code stored therein, said second executable code instructing said second processor to perform operations comprising:

forming correlation peaks by comparing said received beacon signal to a replica signal characterized by said PN sequence, one each of said correlation peaks being associated with one each of said at least two sequential instances of said PN sequence and said shifted PN signal in said beacon signal;

identifying a first value as a first distance between said correlation peaks associated with said each of said PN sequences;

identifying a second value as a second distance between said one of said correlation peaks associated with said shifted PN sequence and said one of said correlation peaks associated with an immediately preceding one of said PN sequences;

determining a shift value by computing a difference between said second value and said first value; and decoding said shift value to produce said message.

15. A communication system as claimed in claim 14 wherein each of said at least two sequential instances of said PN sequence and said shifted PN sequence exhibits a sequence length, and said first executable code instructs said first processor to perform further operations comprising:

expanding said each of said PN sequences and said shifted PN sequence so that said each of said PN sequences and said shifted PN sequence in said DSSS code string has a code length that is greater than said sequence length; and modulating a continuous wave signal by inserting said DSSS code string into said continuous wave signal to produce said beacon signal.

16. A communication system as claimed in claim 14 wherein said first distance is a first quantity of said chips, said second distance is a second quantity of said chips, and said second executable code instructs said second processor to compute said difference as a third quantity of said chips, said third quantity being expressed as an integer value, and said second executable code further instructs said second processor to convert said integer value into at least a portion of said message.

17. A method of communicating a message between a transmitter and a receiver comprising:

generating a direct sequence spread spectrum (DSSS) code string that includes at least one instance of a pseudo-noise (PN) sequence followed by a plurality of successive shifted PN sequences, said PN sequence including a plurality of chips arranged in a first order, each of said successive shifted PN sequences including said plurality of chips arranged in an order that differs from said first order, said successive shifted PN sequences being produced in response to said message, wherein producing said each of said successive shifted PN sequences includes arranging said plurality of chips in said order by establishing a reference position for said PN sequence, removing a portion of consecutive ones of said plurality of chips in said PN sequence beginning at said reference position, and appending said portion of said consecutive chips to an end of said PN sequence to produce said each successive shifted PN sequence;

transmitting a beacon signal from said transmitter toward a receiver, said beacon signal being modulated by said DSSS code string;

receiving said beacon signal at said receiver in response to said transmitting operation;

forming correlation peaks at said receiver, one each of said correlation peaks being associated with one each of said at least one instance of said PN sequence and said each one of said successive shifted PN sequence in said beacon signal;

determining a successive plurality of shift values from said correlation peaks, one each of said shift values being associated with one each of said successive shifted PN sequences; and decoding each of said successive shift values to yield a string of characters that produce said message.

18. A method as claimed in claim 17 wherein said forming operation further comprises:

expressing said successive shift values as successive integer values;

converting said successive integer values into said string of characters within said message using a predetermined character set.

19. A method as claimed in claim 17 wherein said DSSS code string is a first DSSS code string, said PN sequence is a first PN sequence, said correlation peaks are a first set of said correlation peaks, and said method further comprises:

generating a second DSSS code string that includes at least one instance of a second PN sequence followed by an instance of a second shifted PN sequence, said second PN sequence including a second plurality of chips arranged in a third order, said second shifted PN sequence including said second plurality of chips arranged in a fourth order;

said transmitting operation transmitting said beacon signal modulated by both of said first and second DSSS code strings;

said forming operation forming a second set of correlation peaks in response to said second DSSS code string to determine at least a second shift value; and said decoding operation additionally decodes said at least said second shift value, wherein said successive shift values and said at least said second shift value are used to produce said message.

20. A method as claimed in claim 19 further comprising modulating a continuous wave signal by inserting both of said first and second DSSS code strings into said continuous wave signal to produce said beacon signal.

* * * * *